Sept. 2, 1952          E. WILDHABER          2,608,906
MACHINE FOR CUTTING CLUTCHES
Original Filed Dec. 21, 1942          6 Sheets—Sheet 1

Inventor
ERNEST WILDHABER
By
Attorney

Sept. 2, 1952  E. WILDHABER  2,608,906
MACHINE FOR CUTTING CLUTCHES
Original Filed Dec. 21, 1942  6 Sheets-Sheet 2

Inventor
ERNEST WILDHABER
By
Attorney

Sept. 2, 1952     E. WILDHABER     2,608,906
MACHINE FOR CUTTING CLUTCHES
Original Filed Dec. 21, 1942     6 Sheets-Sheet 3

Inventor
ERNEST WILDHABER
By
Attorney

Sept. 2, 1952      E. WILDHABER      2,608,906

MACHINE FOR CUTTING CLUTCHES

Original Filed Dec. 21, 1942      6 Sheets-Sheet 4

Inventor
ERNEST WILDHABER
Attorney

Sept. 2, 1952 — E. WILDHABER — 2,608,906
MACHINE FOR CUTTING CLUTCHES
Original Filed Dec. 21, 1942 — 6 Sheets-Sheet 5

Fig. 34

Inventor
ERNEST WILDHABER
By [signature] Attorney

Sept. 2, 1952 E. WILDHABER 2,608,906
MACHINE FOR CUTTING CLUTCHES
Original Filed Dec. 21, 1942 6 Sheets-Sheet 6

Inventor
ERNEST WILDHABER
By
Attorney

Patented Sept. 2, 1952

2,608,906

UNITED STATES PATENT OFFICE 2,608,906

MACHINE FOR CUTTING CLUTCHES

Ernest Wildhaber, Brighton, N. Y., assignor to Gleason Works, Rochester, N. Y., a corporation of New York Original application December 21, 1942, Serial No. 469,610, now Patent No. 2,438,329, dated March 23, 1948. Divided and this application January 29, 1948, Serial No. 5,049

16 Claims. (Cl. 90—1.4)

1

The present invention relates to machines for producing toothed face clutches. In a more particular aspect, the invention relates to machines for producing clash-type toothed face clutches having longitudinally curved tooth sides. This application is a division of my U. S. application Serial No. 469,610, filed December 21, 1942, Patent No. 2,438,329, issued March 23, 1948, which covers a method of producing clash-type face clutches.

Since the teeth and tooth spaces of the two engaging members of a clash-type clutch are not always in exact register when the clutch members are moved into engagement, their teeth are chamfered to facilitate engagement. The chamfered parts of the teeth of the clutch members have to carry the loads at the beginning of engagement of the clutch members, and since these loads are high, shock loads, it is important that the teeth of clash-type face clutches be so chamfered that the chamfered portions as well as the main portions of the teeth can stand and carry heavy loads.

A primary object of the present invention is to provide a machine for cutting clash-type toothed face clutches so that they will be correctly chamfered.

Another object of the invention is to provide a machine on which the sides as well as the chamfered portions of the teeth of a clash-type clutch member may be cut in a single set-up and in a single operation.

A further object of the invention is to provide a machine for cutting clash-type clutches according to the method of my application Serial No. 469,610 above mentioned.

Another object of the invention is to provide a simple and relatively efficient machine that is universal in character and that may be employed for cutting not only clutches of the clash-type but clutches of other types, also.

Other objects of the invention will be apparent hereinafter from the specification and from the recital of the appended claims.

In a machine built according to the preferred embodiment of this invention, the work spindle is mounted on a column for adjustment thereon in a direction perpendicular to its axis, and the column, in turn, is mounted for angular adjustment on a sliding base which is reciprocable to effect depthwise feed of the work into the rotary cutting tool. The tool, which is of the face-mill type, is adapted to be secured to a cutter spindle which is journaled in a head that is angularly adjustable about an axis intersecting the axis of the cutter spindle so that the cutter spindle may be

2 positioned parallel to the work spindle or tilted relative thereto in accordance with the pressure angle of the side-cutting edges of the cutter and the pressure angles of the tooth sides to be cut on the work. The work spindle is driven through a differential, which may be actuated by two Geneva mechanisms that are angularly adjustable relative to one another; or by a Geneva mechanism and uniform motion gearing. In either case, the combined motions of the driving parts are transmitted through the differential to the work spindle to effect the rotation of the work spindle required in production of any given form of clutch.

For cutting clutches according to the method of my application Serial No. 469,610, the combined motion of the two Geneva mechanisms will drive the work spindle at a varying velocity for the portions of the cycle during which chamfering is effected, hold the work spindle against rotation during side-cutting, and rotate the work spindle periodically, when the cutter is out of engagement with the work, for indexing. For cutting other forms of clutches, such as load-releasing and saw-tooth clutches, the Geneva mechanism may serve solely to effect indexing of the work while a uniform motion drive may be employed in conjunction with it to rotate the work during cutting to produce the required helical tooth surfaces on the work. Other possibilities will appear hereinafter.

Figure 32:
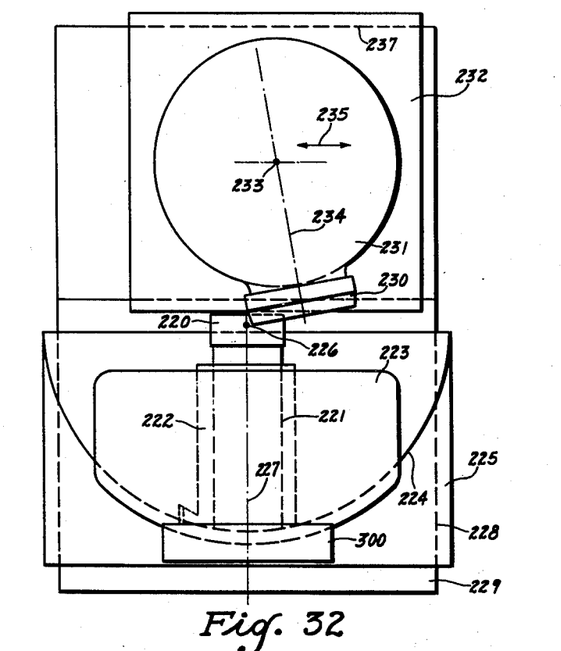
Fig. 32 is a plan view illustrating more or less diagrammatically a clutch-cutting machine constructed according to one embodiment of this invention.
Figure 33:
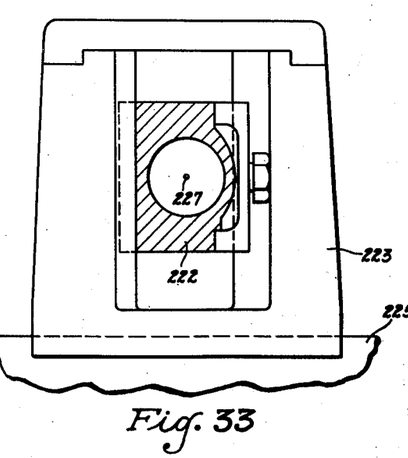
Fig. 33 is a fragmentary view of the work end of the machine showing the work head upright in elevation and the work head in section in a plane perpendicular to the work spindle.

A machine for cutting and chamfering clutch teeth built according to one embodiment of the present invention is illustrated somewhat diagrammatically in Figs. 32 and 33. This machine is suited to produce face clutches of practically any type and in addition may be employed even for the cutting of bevel or hypoid gears without generating roll. It is shown in use cutting and chamfering clutch teeth.

The work piece, which is to be cut, is denoted at 220. It is secured in any suitable manner to a work spindle 221 which is journaled in a vertically adjustable slide 222. Slide 222 is mounted for adjustment in a direction perpendicular to the axis of the work spindle along the guideways of an upright 223. This adjustment is useful in the manufacture of saw tooth clutches and of bevel and hypoid gears.

Upright 223 is angularly adjustable on guideway 224 of a sliding base 225 about an axis 226 which is perpendicular to and intersects the axis 227 of the work spindle. The base 225 slides on ways 228 provided on the frame 229 of the machine. The sliding base is used for adjustment of the work in accordance with the height of the blades of the cutting tool; and it moves, during operation of the machine, to effect the depthwise feed movement.

A face mill cutter or an annular grinding wheel is used for a cutting tool. The cutter 230 is secured to a spindle (not shown) that is journaled in a swivel head 231 which is mounted on a slide 232 for adjustment angularly about an axis 233 which is perpendicular to the axis 234 of the cutter spindle. The slide 232 is mounted on the base 229 of the machine for lateral adjustment in the direction of the arrow 235. The base 229 is provided with ways 237 for this purpose. The various parts of the machine can be driven in any suitable manner to effect cutting of a desired form of clutch or gear.

Figure 34:
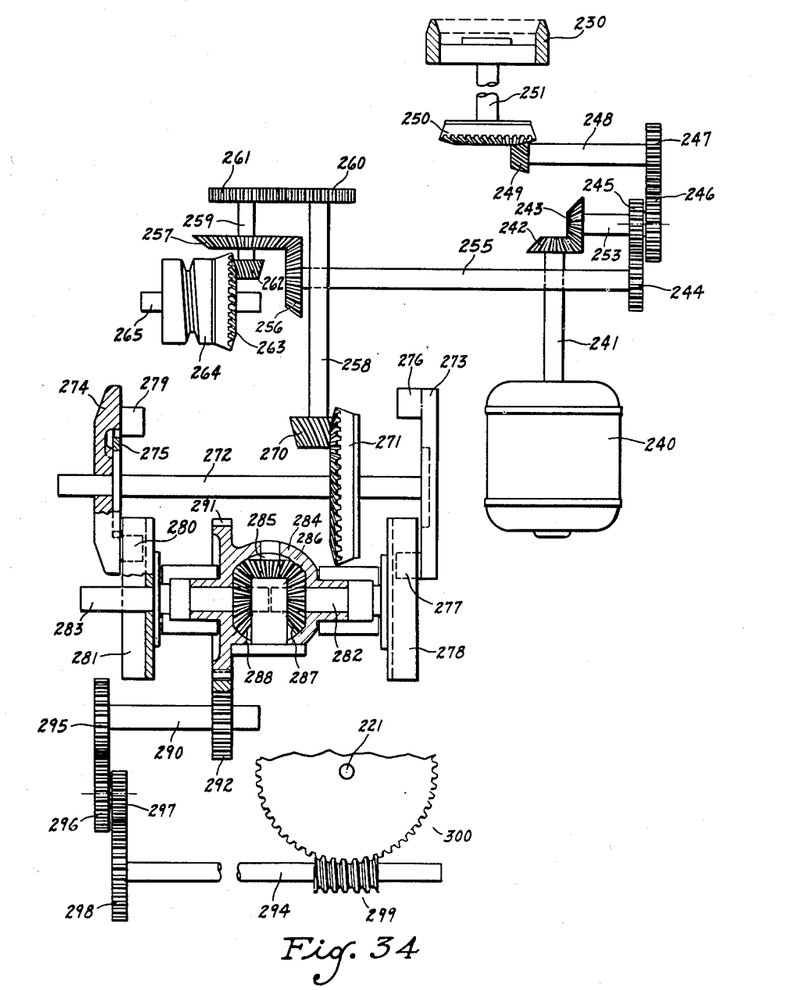
Fig. 34 is a drive diagram of the machine when arranged for one method of operation.
Figure 35:
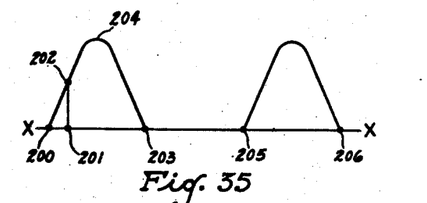
Fig. 35 is a velocity diagram of a simple Geneva motion in which the driver has two rollers spaced 180° apart.
Figure 36:
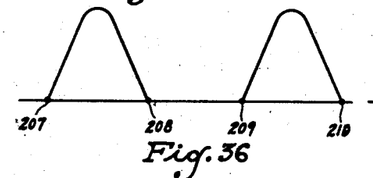
Fig. 36 is a velocity diagram of a simple Geneva motion having a different phase from that of Fig. 35.
Figure 37:
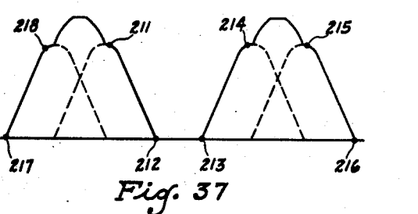
Fig. 37 illustrates diagrammatically what happens when the two Geneva motions of Figs. 35 and 36 are combined, as they may be in the machine constructed according to the present invention, in order to produce the intermittent rotation of the work required for chamfering and indexing where the chamfer surface of the clutch member is to be generated.

One way in which the machine may be geared is illustrated in Fig. 34. Here power is derived from a motor 240. This motor drives the cutter 230 through its armature shaft 241, the bevel gears 242 and 243, the spur change gears 246 and 247, the shaft 248, and the hypoid gears 249 and 250. The last-named gear is secured to the cutter spindle 251.

The shaft 253 drives a shaft 255 through spur change gears 245 and 244. There is a bevel gear 256 secured to shaft 255 which drives a mating bevel gear 257 that is secured to a shaft 259. There is a hypoid pinion 262 secured to the shaft 259 and this pinion drives the hypoid gear 263 which is secured to the feed cam 264 of the machine. The feed cam is mounted on a shaft 265 that is journaled in any suitable manner in the base 229 of the machine. It is operatively connected by a suitable follower in known manner to the sliding base 225 to produce the desired depthwise feed movement of the work as the cam rotates on its axis.

The shaft 259 drives a shaft 258 through the spur change gears 260 and 261. There is a hypoid pinion 270 secured to the shaft 258 at one end thereof. This pinion meshes with a hyphoid gear 271 that is fastened to a shaft 272. Mounted on opposite ends of the shaft 272 are the two drive members 273 and 274, respectively, of two Geneva mechanisms. The drive member 273 may be fixedly secured to the shaft 272, but the drive member 274 is preferably connected to the shaft by means of a toothed clutch which may comprise an external spur gear 275 and internal gear teeth provided on the drive member 274. The spur gear 275 is fixedly secured to shaft 272. This clutch permits of the drive member 274 being adjusted angularly with reference to the drive member 273 to vary the phases of the two Geneva motions relative to one another for the purposes which will appear hereinafter.

The drive member 273 carries two pins 276 and 277 which engage in the slots of a Geneva wheel 278. The drive member 274 carries two pins 279 and 280 which engage in the slots of a Geneva wheel 281. The two Geneva wheels are rigidly secured to aligned shafts 282 and 283, respectively, whose adjacent ends project into and are journaled in a differential housing 284. Journaled on the stud 285 which is secured in the differential housing is a planetary pinion 286. This meshes with the two side gears 287 and 288 of the differential which are secured to the inner ends of the shafts 282 and 283, respectively.

Motion of the differential housing is transmitted to shaft 290 through a spur gear 291, which is secured to or integral with the differential housing, and a spur gear 292 which meshes therewith and which is secured to the shaft 290. The shaft 290 drives shaft 294 through spur change gears 295, 296, 297, and 298. There is a worm 299 fixedly secured to the shaft 294, and this worm meshes with and drives the worm wheel 300 which is secured to the work spindle 221.

The differential serves to combine the two motions of shafts 282 and 283 so that the resultant motion may be transmitted to the work spindle 221. Thus the work spindle may be rotated intermittently in time with the fed motion of the sliding base, may intermittently be held stationary, and may be intermittently indexed. Known means may be employed to lock the Geneva wheels against rotation when the pins of the driving members are out of engagement with them.

Figure 40:
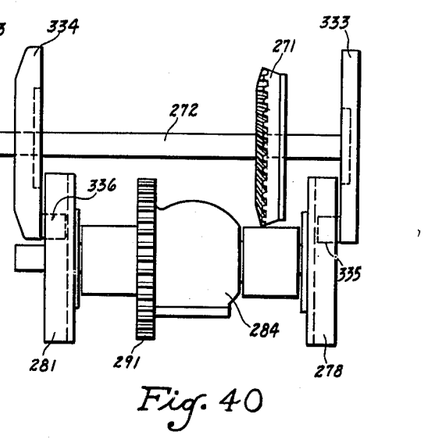
Figs. 40, 41 and 42 are views similar to Fig. 38 illustrating how the drive mechanism of the machine may be further modified to permit cutting formed clutches, double-helical, and saw-tooth clutches, respectively.

Another way in which the work spindle may be driven is illustrated in Fig. 40. This drive is intended for use where the work is held stationary during cutting and is only rotated intermittently for indexing. Here drivers 333 and 334 are substituted for the drivers 273 and 274 (Fig. 34). Each of the drivers 333 and 334 has but a single driving pin. These pins are denoted 335 and 336, respectively. Here the drivers are in the same phase. Shaft 272 is driven at the rate of once per tooth cycle. Accordingly, the work spindle remains stationary on its axis during 270° of rotation of shaft 272 and is indexed during 90° of rotation of that shaft through operation of the two Geneva wheels actuated by drivers 333 and 334, respectively. Hence, during feed of the cutter into the work, the work may be held stationary on its axis; and will be rotated only for indexing when the cutter has been withdrawn.

Figs. 1 to 19 inclusive illustrate one type of clutch whose members may be cut on the machine of this invention and disclose diagrammatically how this may be done. 60 and 61 denote, respectively, the two members of the clutch pair. The member 60 has teeth 62 which extend generally radially of the clutch axis 63 and whose opposite sides 64 and 65 are longitudinally concave. The mating clutch member 61 has teeth 66 which extend generally radially of the clutch axis 63 and whose opposite sides 67 and 68 are longitudinally convex.

The teeth 62 of member 60 are chamfered along their top edges on both sides as denoted at 70 and 71. The teeth 66 of member 61 are chamfered along their top edges on both sides as denoted at 72 and 73.

The sides of the teeth of both clutch members are of zero pressure angle in the instance shown, that is, the profiles of the sides 64 and 65 and 67 and 68 of the teeth of both members extend in the direction of the clutch axis 63. In the instance shown, the sides of the teeth of both clutch members are cylindrical surfaces parallel to clutch axis 63. Moreover, opposite sides of spaced teeth of each clutch member are portions of a common cylindrical surface. Thus, opposite sides 64a and 65b of the teeth 62a and 62b, respectively, of clutch member 60 are parts of a common cylindrical surface whose axis is at 75 and is parallel to the clutch axis 63. Likewise, opposite sides 68a and 67b of spaced teeth 66a and 66b, respectively, of clutch member 61 are portions of a common convex cylindrical surface whose axis is at 76 parallel to clutch axis 63.

The chamfered portions 70 and 71 of the teeth of the clutch member 60 are surfaces of revolution concentric with the corresponding sides of the teeth. Thus, the chamfered portions 70a and 71b at opposite sides of the teeth 62a and 62b, respectively, are longitudinally concave surfaces of revolution of convex profile shape whose common axis is at 75. The chamfered portions 72 and 73 of clutch member 61 are on the other hand helicoidal surfaces of varying lead conjugate to the chamfered portions of the teeth of the clutch member 60. They are of longitudinally convex shape and of convex profile shape. The term "helicoidal surface" is used in this application in a broad sense to describe a surface enveloped by a surface of revolution which moves along and about an axis, usually with a varying ratio of angular to axial motion.

For cutting and chamfering the teeth of clutch member 60, a face mill cutter 80 (Figs. 4, 8 and 9) may be used. This is secured to the cutter spindle 251 (Fig. 34) of the machine so that its axis coincides with the axis 234 of the spindle. The blades 81 of this cutter may be all outside cutting blades. Each may have a straight side-cutting edge 83 of zero pressure angle, a concave chamfering edge 84, a tip cutting edge 85 and a round 86 which connects the side-cutting edge 83 with the tip cutting edge 85. The concave chamfering edge lies below the side-cutting edge adjacent the shank or body portion of the blade. The front faces of the blades may be sharpened in the usual manner with side rake and the outside surfaces of the blades may be relieved with a combined radial and axial relief to provide keen outside cutting edges and keen chamfering edges. The clearance, or non-cutting, sides of the blades may be of any suitable shape, but preferably are ground as surfaces of revolution.

The cutter 80 is preferably positioned to cut simultaneously in two spaced tooth zones of the work and with its axis parallel to the axis of the work and coinciding with the axis 75 of the tooth surfaces to be cut on the work. This position is achieved by adjusting the swivel head 231 (Fig. 32) and the upright 223 of the machine so that the axes 234 and 237 of the tool and work spindles are parallel. Cutting is effected by rotating the cutter spindle while holding the work spindle stationary and while effecting, by movement of sliding base 225 under actuation of cam 264 (Fig. 34), a relative depthwise feed movement between the cutter and the work until full depth position is reached. For this type of cutting operation, the single-pin Geneva wheels 333 and 334 will be employed in the machine as described with reference to Fig. 40.

In full depth position, the straight side-cutting edges 83 (Fig. 9) of the cutter will sweep out and form opposite sides 64 and 65 on spaced teeth of the work which are coaxial and longitudinally concave cylindrical surfaces, while the concave chamfering edges 84 of the cutter will sweep out and form chamfer surfaces 70 and 71 of convex profile at these same sides of the spaced teeth of the work which are coaxial with one another and with the said sides of the teeth as already described. 78 (Fig. 3) denotes the path of a point in the chamfering edge of the tool, and 77 the path of a point in the side-cutting edge of the tool at full depth.

When a pair of tooth sides have been cut and chamfered, the cutter is withdrawn from engagement with the work by cam 264 and the work indexed by action of drivers 333 and 334 and Geneva wheels 278 and 281. Then the cycle begins anew. Thus the tooth sides and chamfer surfaces of the clutch member 60 may be produced simultaneously in a forming operation and in a rapid and efficient process.

With the drive modified, as shown in Fig. 40, by simple substitution of single-pin Geneva drivers 333 and 334 for two-pin Geneva drivers 273 and 274, the machine can be used also for form-cutting bevel and hypoid gears. The side tooth surfaces of such gears are surfaces of revolution, counterparts of the cutting surface of the cutting tool.

The form-cutting method used in cutting and chamfering the teeth of clutch member 60 cannot be applied to the cutting and chamfering of the teeth of the mating clutch member 61, for if the chamfer surfaces of both members were form-cut, the chamfered portions of mating teeth would contact only at the outer ends of the teeth as the clutch members were moved into engagement, and the chamfered portions accordingly could not carry heavy loads. With machines of the present invention, however, it is possible to chamfer the teeth of the clutch member 61 so that any desired amount of lengthwise contact can be obtained between the engaging clutch members as they move into engagement. This contact may extend along the whole length of the chamfered portions of the teeth if desired or along any portion of that length. This contact is obtained by generating the chamfered portions 72 and 73 of the teeth of the clutch member 61 so that they have profile shapes conjugate to the profile shapes of the chamfered portions 70 and 71 of the teeth of the clutch member 60 and so that their lengthwise shapes match to any desired extent the lengthwise shapes of the chamfered portions of clutch member 60.

For cutting and chamfering clutch member 61, a face mill cutter 90 (Figs. 6, 8 and 9) may be employed that has a plurality of inside cutting blades 91 which are arranged circularly about the axis 92 of the cutter and which have cutting portions projecting beyond one side face of the cutter in the general direction of the axis 92 of the cutter. The blades 91 have straight inside cutting edges 93, chamfering edges 94, and tip-cutting edges 95. The side-cutting edges 93 may be of zero pressure angle or of slight negative pressure angle, that is, of slight negative inclination to cutter axis 92. The chamfering edges 94 are of convex profile shape, but unlike the chamfering edges 84 of cutter 80, the chamfering edges 94 of the cutter 90 are arranged adjacent the tips of these blades instead of adjacent the shank portions of the blades. In fact, the chamfering edges 94 of blades 91 connect the side-cutting edges 93 of the blades with the tip-cutting edges 95 thereof.

The convex chamfering edge 94 of a blade 91 has the same profile shape as the convex chamfer surface 70 or 71 of clutch member 60, that is, it is a circular arc of the same radius 96 as the concave chamfering edge 84 of a blade 81 of cutter 80. It will be seen, therefore, that when the cutter 90 is rotated on its axis 92, it embodies the chamfered portions of clutch member 60.

Figure 7:
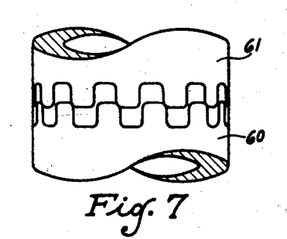
Fig. 7 is a fragmentary elevational view, showing the pair of mating clutch members being moved into engagement and illustrating the principle on which the generating motion employed in producing the chamfered portions of the teeth of one of the clutch members is based.

To generate the required chamfer on the teeth of the clutch member 61, the cutter 90 should be rotated on its axis in engagement with the work while a relative feed movement is effected between the cutter and the work about the clutch axis 63 and in the direction of said axis. The motion produced should be as if the clutch member 60 were contacting at various points along the height of the chamfered surfaces of its teeth with the chamfered surfaces of the clutch member 61 as the two clutch members are moving into engagement. In other words, in cutting the chamfered portions of the teeth of clutch member 61, the cutter 90, which represents the chamfered portion of a tooth of the clutch member 60, should assume such positions relative to the work as are assumed by the chamfered portions of a tooth of the clutch member 60 as the chamfered portion of that tooth engages with and moves over the chamfered portion of a mating tooth of clutch member 61 during movement of the two clutch members into engagement. One of the positions of partial engagement of the two clutch members is shown in Fig. 7.

Figure 8:
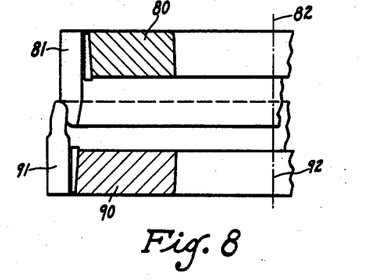
Fig. 8 is a fragmentary axial sectional view showing two face mill cutters such as may be employed for cutting the two members of the clutch pair, respectively, and showing the relationship which exists between these two cutters.
Figure 9:
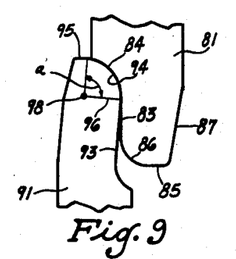
Fig. 9 is a view on an enlarged scale of matching blades of the two cutters, further illustrating the relationship in construction which exists between the cutters.

The relationship of the cutters 80 and 90 for cutting the two clutch members is clearly illustrated in Figs. 8 and 9. It is seen that the convex chamfering edge 94 of a blade 91 of cutter 90 matches the concave chamfering edge 84 of a blade 81 of cutter 80. Moreover, the convex chamfering profile 94 is an arc of the identical circle but preferably is made to extend slightly beyond the concave chamfering edge 84. The straight side-cutting edges 83 and 93 of the two blades need not match. In fact, the straight side-cutting edge 93 of blade 91 is slightly inclined to the straight side-cutting edge 83 of blade 81. The inside cutting diameter of cutter 90 will be the same as the outside cutting diameter of cutter 80 if the mating chamfer surfaces and mating side surfaces of the two clutch members are to have full length contact, but lengthwise mismatch of mating chamfer and mating side surfaces can be obtained by using a cutter of smaller inside diameter to cut clutch member 61 and skipping less teeth between the two tooth zones in which this cutter operates.

In cutting the chamfered portions of clutch member 61, the rotation about the clutch axis 63 is usually performed by the work and the feed movement in the direction of the clutch axis is also performed by the work. There is a definite coordination required between the rotation about the clutch axis and the feed lengthwise of this axis. The required coordination may be determined to correspond to assumed means chamfer profiles, for instance, by layout. The chamfered surfaces 72 and 73 produced are helicoidal surfaces, usually helicoidal surfaces of varying lead.

The rotary motion of the work need take place only while a chamfered surface is being cut. The sides 67 and 68 of the teeth may be cut with the work stationary by depthwise feed of the rotating cutter into the work. The chamfered part at one side of a tooth of the work may be cut during in-feed while the blank is being rotated in time with the in-feed movement. Then the rotation of the blank may be stopped but the in-feed continued to cause the cutter to cut simultaneously the side of the tooth previously chamfered and the opposite side of a spaced tooth of the work as portions of a common surface of revolution. Then the cutter may be withdrawn and, when it has been partially withdrawn, the work rotation may commence again so that during the last part of the withdrawal motion, the cutter will chamfer the last-named tooth on the same side as has been cut.

The cutting and chamfering cycle, which is preferably used for clutch member 61, is illustrated in Figs. 10 to 19 inclusive. Preferably the cutter 90 is positioned to operate in two separate tooth spaces of the work simultaneously. Figs. 10 to 14 inclusive illustrate the cutting action which takes place in one zone of cutting engagement, namely, in the cutting and chamfering at one side of a tooth 66b. These are figures looking from the inside of the clutch outwardly. Figs. 15 to 19 inclusive illustrate the cutting action which takes place in the other zone of cutting engagement, namely, in the cutting and chamfering at one side of tooth 66a. These views are looking from the outside of the clutch inwardly. The rounded chamfering edges 94 of the cutting blades 91, therefore, are at the right in both instances.

Figure 10:
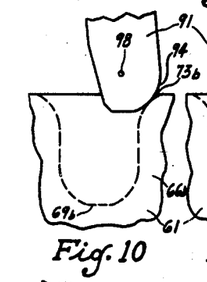
Figs. 10 to 19 inclusive are diagrammatic views illustrating successive steps in the chamfering and cutting of opposite sides of spaced teeth of a clutch member according to the method of application Serial No. 469,610, Figs. 10 to 14 inclusive being views of the cutting and chamfering of one side of a tooth of the clutch member, and Figs. 15 to 19 inclusive being views of the cutting and chamfering of the opposite side of a spaced tooth of the clutch member.
Figure 11:
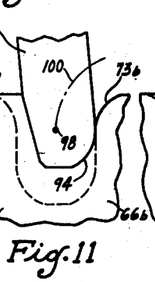
Figure 12:
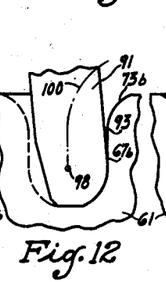
Figures 13, 14:
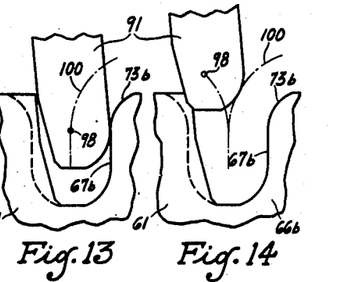
Figure 15:
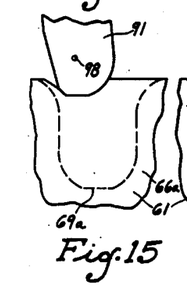
Figure 16:
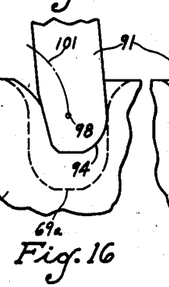
Figure 17:
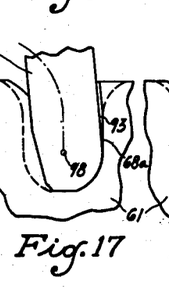
Figure 18:
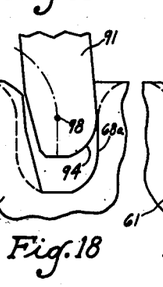
Figure 19:
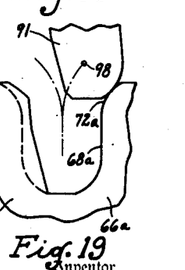

Fig. 10 shows the start of the cut on the rounded chamfer surface 73b of tooth 66b. The final shape of the tooth space 69b adjacent the tooth side 70b is shown in dotted lines. While the cutter is cutting in the tooth space 69b of the blank, it is also cutting in the tooth space 69a. The start of the cut in the latter tooth space is shown in Fig. 15. As the rotating cutter is fed relatively depthwise into the blank, the blank is rotated on its axis in time with the depthwise feed movement to generate the chamfer surface 73b. When the cutter reaches the position illustrated in Figs. 11 and 16, the chamfer surface 73b is completed. Then the turning motion about the clutch axis 63 ceases, but the depthwise feed in the direction of this axis continues. Figs. 12 and 17 show the position of the cutter at full depth. Here the side-cutting edges 93 will have cut the opposite sides 67b and 68a of the teeth 66b and 66a and the chamfering edges 94 of the cutter will sweep out and produce the rounded fillets which join these tooth sides with the bottoms of the tooth spaces 69b and 69a. Then the withdrawal motion starts. At the position indicated in Figs. 13 and 18, the cutter has been withdrawn far enough for the chamfering of the side 72a of tooth 66a to start. Then the rotation about the work axis begins again, and as the cutter travels outwardly from the position of Figs. 13 and 18 to the position of Figs. 14 and 19, it produces the chamfered surface 72a of tooth 66a. As soon as the cutter has moved clear of the work, the blank is indexed. Then the cutter is fed back into engagement with the work and the cycle of chamfering and cutting opposite sides of spaced teeth of the work begins anew.

In Figs. 10 to 19 inclusive, dotted line 100 denotes the path of the centers 98 of chamfering edges 94 of cutter 90 at one tooth zone of the work, and dotted line 101 denotes the path of these same centers in the other tooth zone of the work during the cutting and chamfering cycle.

Figure 1:
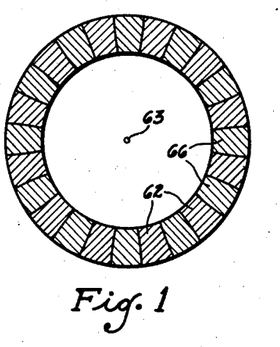
Fig. 1 is a sectional view showing a pair of meshed-toothed face clutch members made according to the method of application Serial No. 469,610, the section being taken in a mean plane, hereinafter referred to as the pitch plane, which is perpendicular to the clutch axis.
Figure 2:
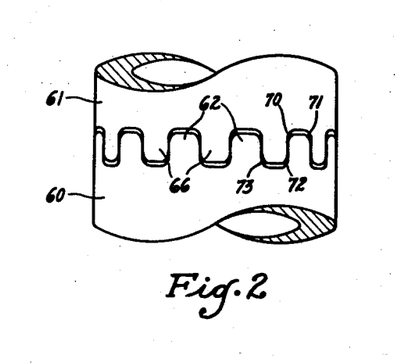
Fig. 2 is a fragmentary elevational view of the pair of engaging clutch members.
Figure 3:
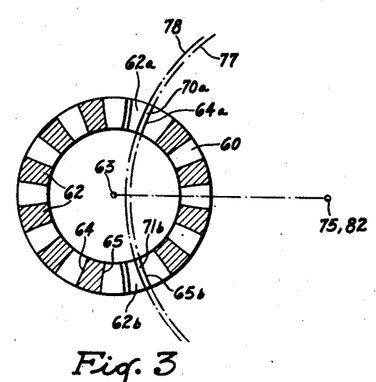
Fig. 3 is a diagrammatic view, showing one of the clutch members partly in section in the pitch plane and partly in plan, and illustrating the principles underlying the cutting and chamfering of the teeth of this member.
Figure 4:
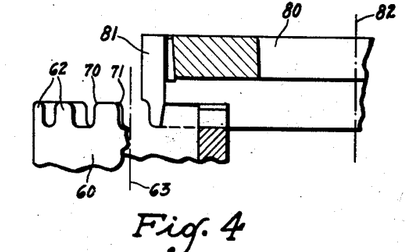
Fig. 4 is a part elevational, part sectional view, further illustrating one way in which the teeth of this clutch member may be simultaneously cut and chamfered.
Figure 5:
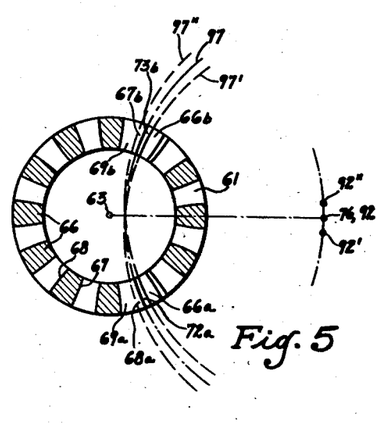
Figs. 5 and 6 are views similar to Figs. 3 and 4, respectively, showing the mating clutch member and illustrating one way of cutting and chamfering the teeth of this mating clutch member.
Figure 6:
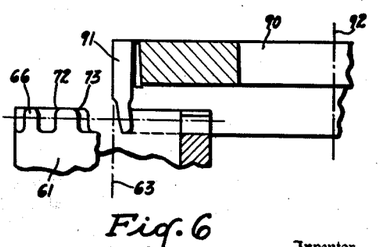

Different relative angular positions of the cutter about the clutch axis during cutting and chamfering of opposite sides of spaced teeth of clutch member 61 are shown diagrammatically in Fig. 5. The chamfered portion 73b of tooth 66b of clutch member 61 is being produced when the axis of the cutter is at 92' and the cutter has been partially fed into depth. The path of a point in the cutting edge of the tool for this position is denoted at 97'. The side surface 67b of tooth 66b and the opposite side surface 68a of tooth 66a spaced from tooth 66b are formed when the cutter axis is in mean position 92, and the cutter is moving to full depth position. The path of said point in the cutting edge of the tool for this position is denoted at 97. The chamfered surface 72a of tooth 66a is being produced when the cutter axis is at position 92'' and the cutter is being partially withdrawn. 97'' denotes the path of the same cutting point when the cutter is at this cutting position. In this way, the chamfered portion of one side of a tooth and subsequently the opposite sides of this tooth and of a spaced tooth are cut during the in-feed, while the chamfered portion of the opposite side of the spaced tooth is produced during the out-feed.

Let us now consider the turning motions to be imparted to the clutch blank when the chamfer surfaces are to be generated and particularly the motions required to be employed to cut the clutch according to the cycle described with reference to Figs. 5, 6, and 10 to 19 inclusive. Here the blank is rotated during chamfering but is held stationary except for its axial depthwise feed while the straight side surfaces of the teeth are being cut. As the cut starts at the top of a tooth in the chamfering operation and gradually generates the chamfered surface at one side of a tooth, the speed of rotation of the work should gradually slow down so that it is at zero when the chamfer is completed and the cutting of the sides of the teeth is to begin. The blank is stationary for a time while the sides proper are being cut and during withdrawal. The rotational movement is gradually resumed in the same direction as before with a slow start when the chamfer surface at the opposite side of a tooth spaced from the tooth previously chamfered is being cut on the way out.

Figure 28:
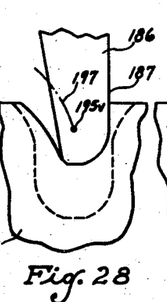

The required turning motion can be derived conveniently from known motions, as, for instance, a Geneva motion. Fig. 28 is a velocity diagram of a Geneva motion with the angle of rotation of the driver plotted on abscissa X—X and the turning velocity of the driven member for the instantaneous ratio plotted as the ordinate. This diagram is for a Geneva motion in which the driver carries two pins 180° apart. The driven member starts to move at point 200. At point 201, it has reached the velocity measured by distance 201—202, assuming that the driver is turning at a constant rate. The velocity increases to its maximum at 204 and then drops down again, reaching zero at point 203. The distance 200—203 corresponds to 90° of rotation of the driver. The driven member then remains stationary for 90° of rotation of the driver. Then it is driven again up to the maximum velocity and back to rest while the second pin is in operation. Distance 205—206 corresponds to 90° of rotation of the driver during operation of the second pin.

Figure 29:
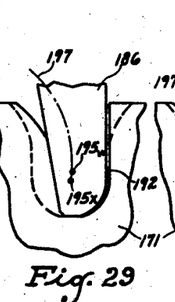

Fig. 29 is a velocity diagram of a Geneva motion like Fig. 28 but having a different phase. The motion of the driven member starts here when the driver is rotated to point 207 and when the velocity plotted in Fig. 28 has approximately reached its peak 204. 208 denotes the point when the driven member comes to rest at the end of operation of the first pin, while 209 and 210 denote, respectively, the beginning and end of operation of the second pin.

Figure 30:
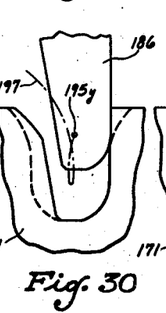
Figure 31:
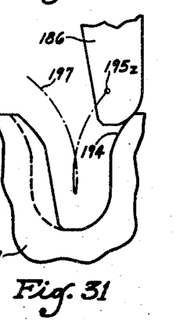

When two Geneva motions, such as illustrated in Figs. 28 and 29, are added together, as can be done by means of a differential, a velocity diagram as shown in Fig. 30 results. The motion here plotted can be used in the cutting of a member 61 or 121. This is the motion that may be obtained by using the two-pin drivers 273 and 274 of Fig. 34. The chamfer cut may start at point 211 and end at point 212 with the drivers rotating and driving the work spindle 221 through differential 284 while the work is being fed into the cutter through operation of cam 264. Then the work may remain stationary during rotation of the drivers from point 212 to point 213 during which the fed of the work to full depth and partial withdrawal of the work and cutting of opposite sides of spaced teeth of the work may take place; and then rotation of the work will start again for the chamfering of the opposite side of the tooth, the chamfering ending at 214. Between 214 and 215, the work will be indexed. Then the cycle will start anew, chamfering at one side of a tooth taking place during rotation of the blank from 215 to 216, cutting of the sides from partial withdrawal taking place while the work is stationary during interval 216—217 and chamfering of the opposite side of a spaced tooth taking place during rotation from 217 to 218, and the blank being again indexed in the portion 218—211 of the cycle.

Figure 20:
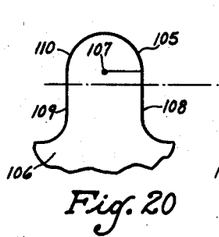
Fig. 20 is a normal sectional view on an enlarged scale of a tooth of a modified form of clutch member.
Figure 21:
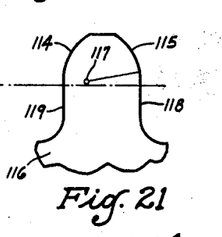
Fig. 21 is a similar view showing a tooth of a clutch member made according to a still further modified form.

The machine may be used in producing various other forms of clutch teeth. Figs. 20 and 21 show two other forms that may be cut when the machine is geared as shown in Fig. 34.

In Fig. 20, 105 denotes the profile of the chamfered surface at one side of a tooth 106. This profile is a circular arc whose center is at 107. Such a chamfer surface joins the straight zero pressure angle tooth side 108 smoothly without angle. The center 107 may be midway between the sides 108 and 109 of the tooth 106 and the top of the tooth may be fully rounded, as shown. In Fig. 21, the chamfer surface 115 is again of circular arcuate profile shape, but its profile shape is of larger radius being centered at 117. The chamfer surfaces 115 and 114 at the sides of the tooth 116 may join the respective tooth sides 118 or 119 at slight angles. Of course, the chamfer surfaces need not be of circular arcuate profile shape but may be of any desired profile curvature.

Figs. 22 to 31 inclusive illustrate another clutch member 171 and how the same may be cut. Figs. 22 to 26 inclusive are views from the inside of a clutch member outwardly at one zone of cutting engagement, while Figs. 27 to 31 inclusive are views of the simultaneous positions of the cutter in engagement with the work at the other zone of its cutting operation and looking from the outside of the clutch member inwardly.

Here a face-mill cutter is employed whose blades 186 have convex chamfering edges 189 adjacent their tips and straight side-cutting edges 187 of positive pressure angle. The cutter is tilted with reference to the work in accordance with the pressure angle of the tooth sides to be cut on the work. The chamfering of the teeth of clutch member 171 is done by rotation of the cutter on its axis and a feed motion about and in the direction of the clutch axis. A tooth is chamfered at one side thereof during the first part of the in-feed movement and a spaced tooth is chamfered at the opposite side thereof during the last part of the out-feed movement. In contradistinction to the method of cutting illustrated in Figs. 10 to 19 inclusive, one side surface of a tooth is finished before full depth is reached and the other side after full depth by slightly turning the clutch blank toward the cutter, first in one direction and then in the other. This permits of finishing the opposite sides 191 and 192 of the clutch teeth with the side-cutting edges 187 of the cutter in contrast to the action of the cutter 91, for instance, which cuts the sides of the clutch teeth with its convex cutting edges 94. Smoother tooth surface finish can be obtained with the embodiment of the invention shown in Figs. 22 to 31.

Figures 22, 23:
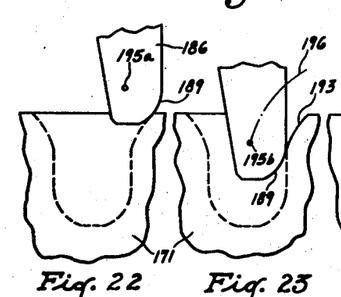
Figs. 22 to 31 inclusive illustrate diagrammatically a further modification of the process of generating the chamfer and cutting opposite sides of spaced teeth of a clutch member according to the method of application Serial No. 469,610, Figs. 22 to 26 inclusive being views of the cutting and chamfering of one side of a tooth of the clutch member, and Figs. 27 to 31 inclusive being views of the cutting and chamfering of the opposite side of a spaced tooth of the clutch member.
Figure 24:
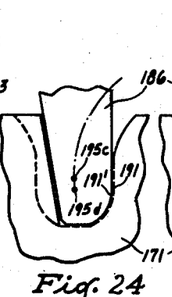
Figure 25:
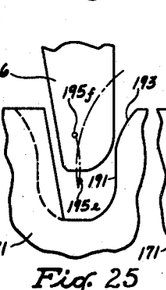
Figure 26:
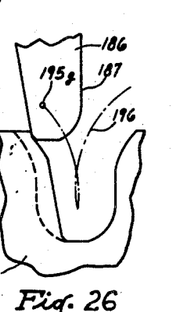
Figure 27:
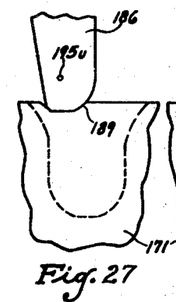

Fig. 22 shows the start of generation of the rounded chamfer portion 193 of one of the teeth of the clutch member. Fig. 27 shows the position simultaneously assumed by the cutter in the other tooth zone of the work. As the cutter rotates on its axis, relative feed motion is effected about and in the direction of the work axis. The cutter therefore moves from the position shown in Figs. 22 and 27 to the position shown in Figs. 23 and 28. The centers of curvature 195 of the chamfering edges 189 of the blades travel along the path 196 in one tooth zone from position 195a to position 195b and for the other tooth zone along path 197 from position 195u to position 195v. When the cutter attains the position shown in Fig. 23, the chamfer 193 will have been completed. In cutting this clutch member, the rotational movement of the work does not cease when the chamfer portion of the tooth has been generated but it continues at a decreased rate through a slightly greater angle. It ceases and is reversed near the full depth position of Figs. 24 and 29. The position of the center of the chamfering edge just before reversal of the work rotation is denoted at 195c and the position after reversal is denoted at 195d for one tooth zone of the work while the corresponding positions are denoted at 195w and 195x for the other tooth zone of the work. Before reaching the full depth position of Fig. 29, the cutter in its operation in the tooth zone of Fig. 29 will have finished the tooth side 192. The direction of rotation of the work is again reversed soon after the cutter leaves full depth position on the withdrawal movement, the center of the chamfering edge moving to position 195e. This reversal of movement causes the cutter to clean up the stock between the roughed tooth side 191' and the finished tooth side 191 (Fig. 24) and the straight side 191 of a tooth is finished with straight side cutting edge 187. This completes the whole of one side of one tooth as shown in Fig. 25. It will be noted that the profile center of the chamfering edge forms a flat loop. As the tool moves further out of cutting depth, it produces a chamfered surface 194, the production of the chamfer starting when the cutter is in the position shown in Fig. 30 with the center of the chamfering surface at 195y and being practically completed in the position shown in Fig. 31 when the center of the chamfer surface is at 195z. Fig. 26 shows the position of the cutter corresponding to that of Fig. 31 for the other tooth zone of the work. Here the center of the chamfering edge is at 195g along path 196. When the cutter has cleared the blank in the withdrawal movement, the blank continues to rotate to present two new tooth sides to the cutting tool and the cutting cycle then begins anew.

Figure 38:
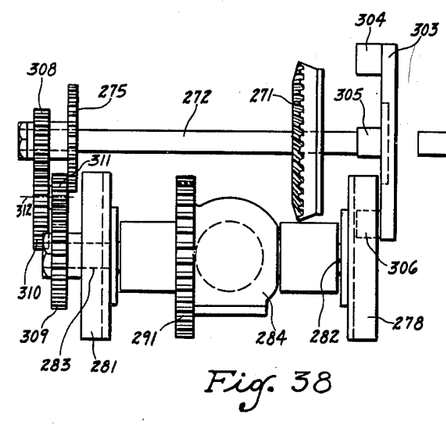
Fig. 38 is a fragmentary view, showing how the drive of my machine may be modified for a modified method of machine operation.

When it is desired to cut a clutch member such as illustrated in Figs. 22 to 31 inclusive a slight modification in the drive of the machine is required, see Fig. 38. Here the driver 273 is replaced by a driver 303 having four drive pins spaced 90° apart. Three of these are shown at 304, 305 and 306, respectively. Driver 274 is also removed and a spur gear 308 is substituted therefor. This spur gear is keyed to the shaft 272. The Geneva wheel 281 need not be removed from shaft 283, but is, of course, inoperative. A spur gear 309 is secured, however, to the outer end of the shaft 283, and additional spur gears 310 and 311 are mounted on an intermediate shaft, whose axis is indicated at 312, to mesh with the spur gears 308 and 309, respectively, to transmit motion from the shaft 272 to the shaft 283. The shaft 283 is therefore driven at a uniform velocity and in the same direction as the shaft 272, but in a direction opposite to the intermittent rotation of the shaft 282 under actuation of the Geneva mechanism 303—278. It is seen, then, that the resultant motion of the differential housing 284 corresponds to subtracting the uniform motion of shaft 283 from the intermittent variable motion of shaft 282.

Figure 39:
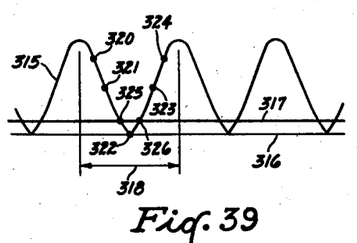
Fig. 39 is a velocity diagram illustrating the rotational movement of the work spindle when the drive is arranged as shown in Fig. 38 for cutting the teeth of a clutch member according to the modified process shown in Figs. 22 to 31 inclusive.

The motion of the work when the machine is geared according to Fig. 38 is illustrated diagrammatically by the velocity diagram of Fig. 39. The velocity curve 315 has no dwells but consists of a series of successive rises and falls. This results with a Geneva motion when one pin of the driver starts engagement with the Geneva wheel as another pin leaves off engagement. This is the result, in other words, of use of a driver such as the driver 303 which has four pins spaced 90° apart. In the modification of the invention illustrated in Figs. 22 to 31 inclusive, the turning motion of the work not only stops but is also slightly reversed. To obtain this, a uniform motion must be subtracted from the Geneva motion. This occurs when change gears 308, 310, 311 and 309 instead of a Geneva mechanism, are used to drive shaft 283.

In the velocity diagram of Fig. 39 the result of the combination of uniform motion on shaft 283 with varying motion on shaft 282 is that the abscissa is raised from a position such as denoted at 316 to the position 317. Distance 318 corresponds to a tooth cycle and to 90° rotation of shaft 272. Point 320 on curve 315 corresponds to the position shown in Figs. 22 and 27 at the start of the chamfering operation on a side of a tooth. Point 321 corresponds to the position shown in Figs. 23 and 28 when the chamfering operation at this tooth side is complete. Point 322 corresponds to the full-depth position shown in Figs. 24 and 29. Point 323 corresponds to the position of Figs. 25 and 30 when the chamfering operation on the opposite side of a spaced tooth is starting, and point 324 to the position of Figs. 26 and 31 when this chamfering operation is about completed. The opposite side surfaces 191 and 192 of spaced teeth are finished, respectively, at times corresponding to points 325 and 326, respectively, when the blank stands still for a moment.

Figure 41:
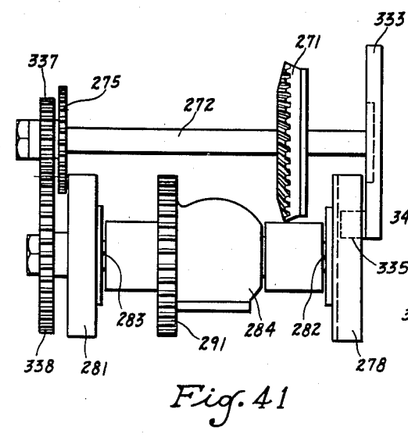
Figure 42:
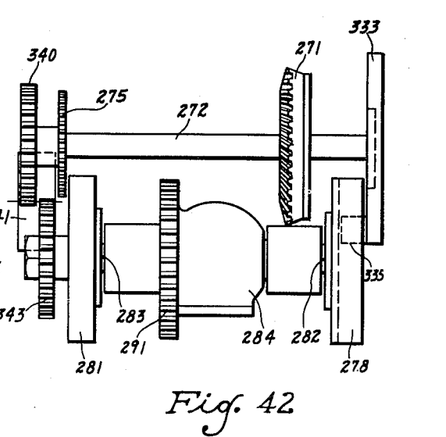

Fig. 41 illustrates how the drive mechanism of the machine may be modified in order to cut load releasing clutches whose opposite side tooth surfaces are helical surfaces. Fig. 42 illustrates how the drive of the machine may be modified in order to cut a saw-tooth type of clutch which has one side of each tooth straight and parallel to its axis and the other side a helical tooth surface. In each case, a drive member 333 with a single pin 335 is employed to drive shaft 282. The shaft 283, in each case, is driven from the shaft 272 at a uniform velocity. In the arrangement of Fig. 41 the drive to the shaft 283 is through a single pair of spur change gear 337 and 338 so that through operation of the differential 284, the uniform motion of the shaft 283 may be added to the intermittent Geneva motion of shaft 282. In the arrangement of Fig. 42, the drive to the shaft 283 is through compound change gears 340, 341, and 343 so that the intermittent Geneva motion is subtracted from the uniform motion obtained through said change gears.

Moreover, while the invention has been described in connection with the cutting of clutches, it will be understood that it is applicable also to the grinding of clutches. Instead of a face mill cutter, for instance, an annular grinding wheel may be used, or a cup-shaped oscillatory grinding wheel. The grinding wheels may be shaped and employed in the same way as the cutters previously described. In the specification and claims, therefore, where the term cutting or cutting tool is used, it is to be understood that it is intended to include also grinding and grinding tools.

Indeed, while a number of different embodiments of the invention have been described, it will be understood that the invention is capable of still further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. A machine for cutting clutches and the like comprising a base, a pair of slides mounted on the base for movement in two directions at right angles to one another, a tool support mounted on one slide and a work support mounted on the other slide for angular adjustment on the slide about axes that are parallel to one another, a tool spindle journaled in the tool support with its axis at right angles to the axis about which the tool support is adjustable, a work spindle journaled in the work support with its axis extending at right angles to the axis of adjustment of said work support, a face mill cutter secured to the tool spindle, means for rotating the tool spindle, means for rotating the work spindle intermittently, and means for reciprocating one slide to effect alternate relative feed of the cutter into and away from the work.

2. A machine for cutting clutches and the like comprising a base, a pair of slides mounted on the base for movement in two directions at right angles to one another, a tool support mounted on one slide and a work support mounted on the other slide for angular adjustment on the slides about axes that are parallel to one another, a tool spindle journaled in the tool support with its axis at right angles to the axis about which the tool support is adjustable, a work spindle journaled in the work support with its axis extending at right angles to the axis of adjustment of the work support, a face mill cutter secured to the tool spindle, means for rotating the tool spindle, means for rotating the work spindle intermittently, and means for reciprocating one slide to effect alternate relative feed of the cutter into and away from the work, the means for rotating the work spindle comprising a differential, one element of which is connected to the work spindle, and means for separately driving the other two elements of the differential at different rates.

3. A machine for cutting clutches and the like comprising a tool support, a tool rotatably mounted on said support, means for rotating the tool, a work support, a work spindle journaled in the work support, means for rotating the work spindle, a continuously rotating shaft having two driving connections with said means for rotating the work spindle, means for producing intermittent rotary motion in one direction in one of said driving connections, means for producing motion in one dirction only in the other driving connection, means for combining the motions of the two driving connections, said last-named means being connected to said means for rotating the work spindle to actuate the same, and means for producing a depthwise feed between the tool and the work in time with the rotation of said continuously rotating shaft.

4. A machine for cutting clutches and the like comprising a tool support, a tool rotatably mounted on said support, means for rotating the tool, a work support, a work spindle journaled in the work support, means for rotating the work spindle comprising a continuously rotating shaft, means for effecting intermittent rotary motion in one direction on rotation of said shaft, means for producing continuous rotation in one direction on rotation of said shaft, and means for combining the intermittent rotation with the continuous rotation, said last-named means being operatively connected with the work spindle to rotate the same, and means for producing a depthwise feed between the tool and work in time with the rotation of said shaft.

5. A machine for cutting clutches and the like comprising a tool support, a tool rotatably mounted on said support, means for rotating the tool, a work support, a work spindle journaled in the work support, means for rotating the work spindle comprising a continuously rotating shaft, means for effecting intermittent rotary motion in one direction on rotation of said shaft, means including change gears for producing continuous rotation in either direction on rotation of said shaft, and means for combining the intermittent rotation with the continuous rotation in either direction so that the two motions may be added or subtracted, said last-named means being operatively connected with the work spindle to rotate the same, and means for producing a depthwise feed between the tool and work in time with the rotation of said shaft.

6. A machine for cutting clutches and the like comprising a tool support, a tool rotatably mounted on said support, means for rotating the tool, a work support, a work spindle journaled in the work support, means for rotating the work spindle comprising a continuously rotating shaft, means for effecting intermittent rotary motion in one direction on rotation of said shaft, separate means operative on rotation of said shaft for producing motion continuously during the work of the cycle of cutting a tooth, and means for combining the intermittent rotation with the continuous motion, said last-named means being operatively connected with the work spindle to rotate the same, and means for producing a depthwise feed between the tool and the work in time with the rotation of said shaft.

7. A machine for cutting clutches and the like comprising a tool support, a tool movably mounted on said support, means for actuating the tool, a work support, a work spindle journaled in the work support, means for rotating the work spindle comprising a continuously rotating shaft, a differential, separate means for driving two elements of said differential from said shaft, at least one of which rotates its element intermittently, and means for connecting a third element of the differential to the work spindle to drive the work spindle, and means for producing a depthwise feed between the tool and work in time with the rotation of said shaft.

8. A machine for cutting clutches and the like comprising a tool support, a tool movably mounted on said support, means for actuating the tool, a work support, a work spindle journaled in the work support, means for rotating the work spindle comprising a continuously rotating shaft, a differential, separate means for intermittently driving two elements of said differential from said shaft, and means for connecting a third element of the differential to the work spindle to drive the work spindle, and means for producing a depthwise feed between the tool and work in time with the rotation of said shaft.

9. A machine for cutting clutches and the like comprising a tool support, a tool movably mounted on said support, means for actuating the tool, a work support, a work spindle journaled in the work support, means for rotating the work spindle comprising a continuously rotating shaft, a differential, separate means for intermittently driving two elements of said differential from said shaft, and means for connecting a third element of the differential to the work spindle to drive the work spindle, and means for producing a depthwise feed between the tool and work in time with the rotation of said shaft, said shaft being driven to make one revolution per tooth cycle of the machine, and both of said intermittent drive means being constructed to actuate their respective differential elements a plurality of times per tooth cycle of the machine.

10. A machine for cutting clutches and the like comprising a tool support, a tool movably mounted on said support, means for actuating the tool, a work support, a work spindle journaled in the work support, means for rotating the work spindle comprising a continuously rotating shaft, a differential, means for intermittently driving one element of said differential from said shaft, means for continuously driving another element of the differential from said shaft, and means for connecting a third element of the differential to the work spindle to drive the work spindle, and means for producing a depthwise feed between the tool and work in time with the rotation of said shaft.

11. A machine for cutting clutches and the like comprising a tool support, a tool movably mounted on said support, means for actuating the tool, a work support, a work spindle journaled in the work support, means for rotating the work spindle comprising a continuously rotating shaft, a differential, means for intermittently driving one element of said differential from said shaft, means for continuously driving another element of the differential from said shaft, and means for connecting a third element of the differential to the work spindle to drive the work spindle, said shaft being driven to make one revolution per tooth cycle of the machine, and said intermittent drive means being constructed to actuate its differential element a plurality of times per tooth cycle of the machine.

12. A machine for cutting clutches and the like comprising a tool support, a tool movably mounted on said support, means for actuating the tool, a work support, a work spindle journaled in the work support, means for rotating the work spindle comprising a continuously rotating shaft, a differential, means for intermittently driving one element of said differential in one direction from said shaft, means for continuously driving another element of the differential from said shaft in the opposite direction, and means for connecting a third element of the differential to the work spindle to drive the work spindle, and means for producing a depthwise feed between the tool and work in time with the rotation of said shaft.

13. A machine for cutting toothed face clutches and the like comprising a work support, a tool support, a work spindle journaled on the work support, a tool mounted on the tool support, a slide on which one of said supports is mounted and which is movable depthwise of the work, means for actuating the tool, a differential, means for imparting motion to one element of said differential, means for imparting a separate and different motion to another element of said differential, means connecting said differential to said work spindle to impart the combined motion of said two elements of the differential to said work spindle during cutting, and means for moving said slide in time with the motion imparted to the work spindle by said connecting means to effect relative depthwise feed motion between the cutter and work during cutting.

14. A machine for cutting toothed face clutches and the like comprising a work support, a tool support, a work spindle journaled in the work support, a face mill cutter journaled on said tool support, a slide on which one of said supports is mounted, said slide being movable in a direction depthwise of the work, means for rotating the cutter, a three-element differential, means for imparting an intermittent motion to one element of said differential, means for imparting a different intermittent motion to a second element of said differential, means connecting the third element of said differential to said work spindle to impart the combined motion of the two first-named elements of said differential to said work spindle during cutting, and means for moving said slide in time with the motion imparted to the work spindle by said connecting means to effect relative depthwise feed motion between cutter and work.

15. A machine for cutting toothed face clutches and the like comprising a work support, a tool support, a work spindle journaled in the work support, a face mill cutter journaled on said tool support, a slide on which one of said supports is mounted, said slide being movable in a direction depthwise of the work, means for rotating the cutter, a three-element differential, means for imparting an intermittent motion to one element of said differential, means for imparting a continuous motion at a uniform velocity to a second element of said differential, means connecting the third element of said differential to said work spindle to impart the combined motion of said first two elements to said work spindle, and means for moving said slide in time with the motion of said work spindle to effect relative depthwise feed motion between the cutter and work.

16. A machine for cutting toothed face clutches and the like comprising a base, a work support, a tool support, a work spindle journaled in the work support, a face mill cutter journaled in the tool support, a slide on which one of said supports is mounted, said slide being reciprocable on said base in the direction of the axis of the work spindle, means for rotating said cutter, means for reciprocating said slide, a three-element differential, means comprising a Geneva mechanism for driving one element of said differential intermittently, means comprising a Geneva mechanism for driving a second element of said differential intermittently, said two Geneva mechanisms being out of phase with one another, and means connecting the third element of said differential to said work spindle to drive said work spindle from said differential.

ERNEST WILDHABER.

REFERENCES CITED

The following references are of record in the file of this patent:

UNITED STATES PATENTS

| Number | Name | Date |
|---|---|---|
| 2,044,485 | Schauseil et al. | June 16, 1936 |
| 2,302,004 | Carlsen | Nov. 17, 1942 |